A. W. HALE.

Flexible Gas-Tubing.

No. 129,405. Patented July 16, 1872.

Witnesses:

Inventor:

129,405

UNITED STATES PATENT OFFICE.

ALBERT W. HALE, OF NEW YORK, N. Y.

IMPROVEMENT IN FLEXIBLE GAS-TUBINGS.

Specification forming part of Letters Patent No. 129,405, dated July 16, 1872.

SPECIFICATION.

*To all whom it may concern:*

Be it known that I, ALBERT W. HALE, of the city of New York, in the county of New York and State of New York, have invented a new and useful Improvement in the Construction of Flexible Gas-Tubing; and I do hereby declare that the following is a full, clear, and exact description thereof and of its mode or manner of construction, reference being had to the accompanying drawing and to the letters of reference marked thereon and making a part of this specification.

The object of my invention is to produce a tube, for conveying illuminating and other gases, which shall be pliable or flexible, but which shall be mostly made of such materials as are not affected by such gases, and through which such gases cannot escape, and in which those portions which make the tubing flexible, and which are exposed to the action of the gases, are reduced to a minimum. My invention consists in forming such tubes of numerous separate pieces or sections of tubing, which may be of glass, or metal, or any other suitable material not liable to be affected by the gas or permitting the gas to pass through its substance, and connecting such sections by means of pieces of tubing of caoutchouc or other pliant material, and which give and secure the required pliability or flexibility to the entire tube.

Figure 1:
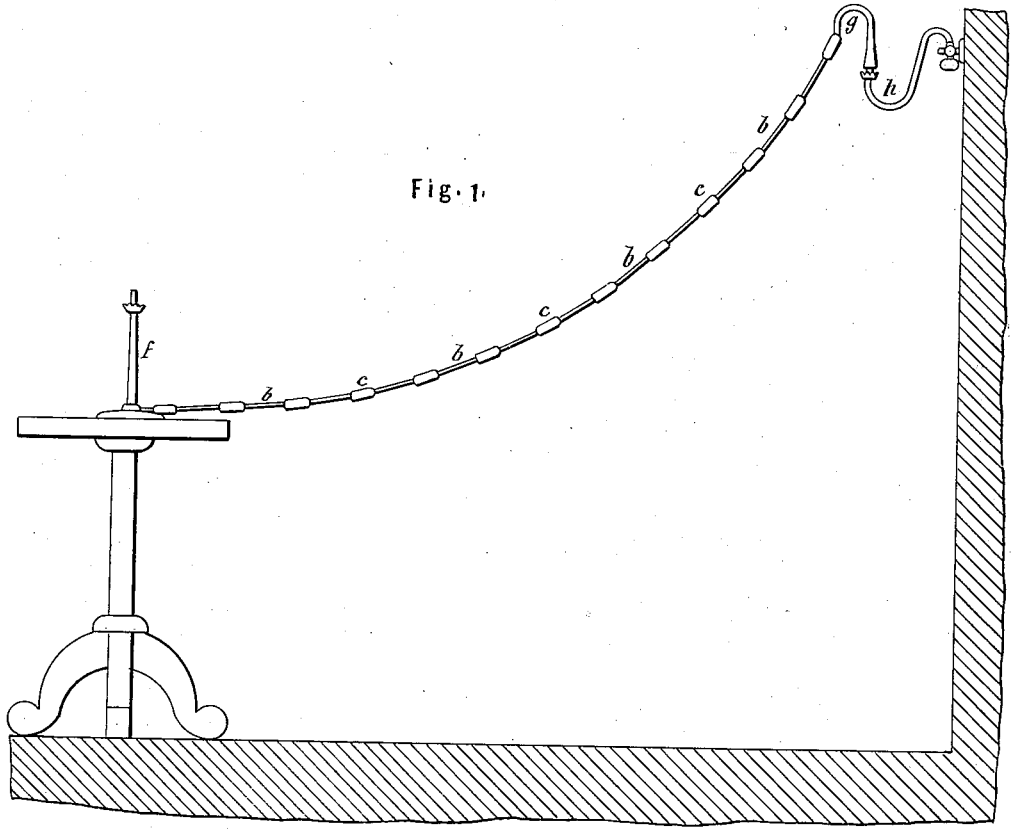
Figure 2:
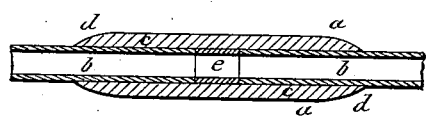
Figure 3:
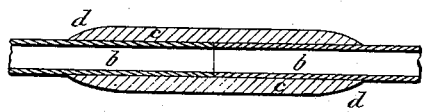
Figure 4:
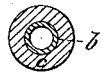

Figure 1 is a side elevation of a length of my improved tubing, connecting a gas-jet and a movable burner. Fig. 2 is a longitudinal section of two pieces of such tubing and their inclosing flexible jointing, of full size, and showing a double joint. Fig. 3 is a like view of two such pieces, and showing a plain or single joint. Fig. 4 is a cross-section of Fig. 2 through the line *a a*.

The separate pieces or sections composing such tubing, and which may be of metal, glass, or other suitable material, as shown at *b b*, and their dimensions may vary, as represented in the drawing. They are six inches long, and twenty-seven one-hundredths inch outside, and nineteen one-hundredths inch inside diameter. The flexible tubings which form the joints are shown at *c c*, and are supposed to be or represented as made of vulcanized India rubber. These will, of course, vary, according to the size of the sections *b b;* but they should have a sufficient thickness to prevent their being bent at a sharp angle by the mere weight of the tube, and should not be so thick as to render the tube rigid; and they should be long enough to extend over the ends of the sections *b b*, so as to secure a tight joint. Their inside diameter should also be somewhat less than the outside diameter of the parts *b b* in order that they may closely adhere, by their elasticity, to such parts. The outside edges of such flexible tubings *c c* may be rounded, as at *d d*, or such tubings may, if preferred, be extended so as to cover wholly the pieces *b b*.

Fig. 3 illustrates a joint made by placing the ends of two of the sections *b b* close to each other and putting around them a piece of flexible tubing, *c*.

Fig. 2 illustrates another form of joint, or what may be called a double joint, made by inserting a short section, *e*, of tubing, of metal, glass, or other suitable material, between the ends of two sections, *b b*, for the purpose of increasing the flexibility of the joint, by affording two adjacent points of flexure. One or more of such short sections may be made use of. The dimensions of such short pieces *e* may vary somewhat, but it is probably desirable that their length should be greater than their outside diameter in order to guard against any tendency to turn in the tubing *c c*. As shown in the drawing, such section *e* is thirty-two one-hundredths inch long, with the same external and internal diameter as the longer sections *b b*. The ends of such sections *b b e* may also be slightly beveled, for the purpose of increasing the flexibility of the joints, by throwing the points of flexure nearer the center of the tube, and thus diminishing the strain upon the joints by decreasing the length of the arc through which the elastic material is stretched.

The complete tube, including the rigid and flexible sections, may be covered or not, as desired, and for such covering any suitable material may be used.

A tube so constructed may be of any length, and having any desired number of separate sections *b b*. The drawing, Fig. 1, represents such a tube of twelve sections and about six feet long, connected at one end to a movable burner, *f*, and at the other end to a "goose-neck," *g*, applied to a gas-jet, *h*, the connection with the goose-neck and the movable burner being, by means of the flexible tubing $c\ c$, used to form the joints in the tube. By the use of soluble rubber in connecting the tubing $c\ c$ to the sections $b\ b$ the joints are made tighter and more durable.

What is claimed as new is—

1. A flexible gas-tube, formed by connecting rigid sections of tubing $b\ b$ by flexible joints, substantially as described.

5. The use or application of the short sections $e$, inserted in the joint between the ends of the longer or other sections $b\ b$, for the purposes set forth.

ALBERT W. HALE.

Witnesses:
S. D. LAW,
A. T. GURLITZ.